June 29, 1965  A. FISCHER, JR  3,191,781
ARTICLE HANDLING APPARATUS
Filed Dec. 5, 1961
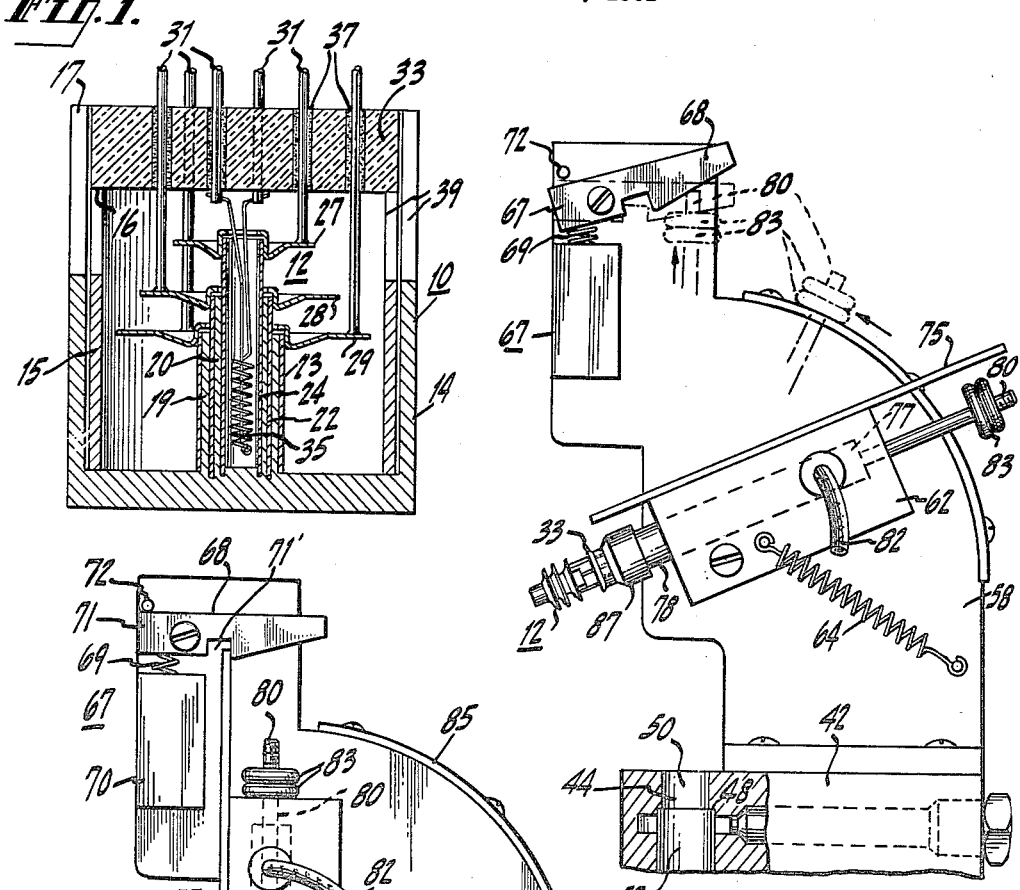
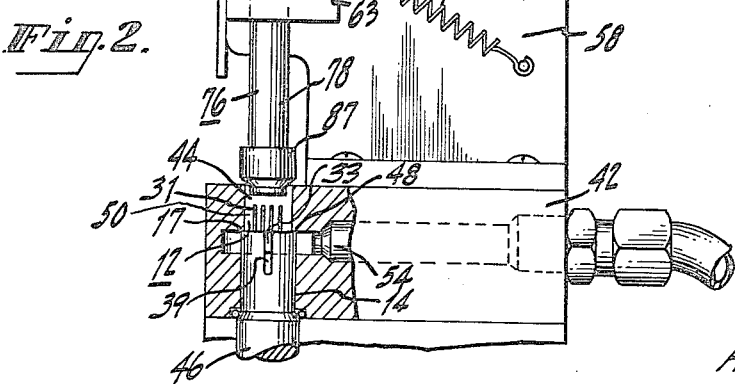
INVENTOR.
ADAM FISCHER, JR.
BY
William G. Balesak
Attorney

3,191,781
ARTICLE HANDLING APPARATUS
Adam Fischer, Jr., Maplewood, N.J., assignor to Radio Corporation of America, a corporation of Delaware
Filed Dec. 5, 1961, Ser. No. 157,092
4 Claims. (Cl. 214—1)

This invention relates to apparatus for handling articles of manufacture and particularly to apparatus for receiving and transferring moving articles of manufacture from one work station to another. This invention has particular utility in the manufacture of electron tubes, and will be described in connection therewith.

In one recently designed electron tube, hereinafter described, the method of assembly of the tube involves loading a number of tube elements in loosely assembled relationship within a cup-shaped assembly and brazing jig, jigging elements therein providing the desired spacings between the tube elements. The loaded jig is then heated in a furnace to braze the tube parts to form a unitary mount assembly. To remove the brazed mount from the jig, the loaded jig is placed in an extractor apparatus wherein pressurized air is admitted into the jig. One of the mount parts substantially closes the open end of the jig, and the pressurized air blows the mount from the jig.

One source of difficulty caused by this method of mount extraction is that the mount is blown from the jig at a very high velocity. This is due to the fact that during brazing, stresses are produced which tend to tilt the mount elements and jam them against their respective jigging elements. Hence, the mount is literally exploded from the jig when the air pressure therein reaches a level sufficient to free the jammed mount elements. The average initial velocity of the extracted mounts has been calculated to be 35 feet per second.

A problem caused by this high mount initial velocity is the difficulty of decelerating the mount to a gentle stop without jarring the mount and causing damage to the mount elements and changes in spacings therebetween. This problem is further accentuated by the fact that in order to prevent tumbling of the moving mounts, which would require extra handling of the mounts to reorient them, it is desirable to capture or receive the mounts immediately after they leave their jigs. Thereafter, it is desirable to transfer the mounts in uniform orientation to the next mount operating station.

Therefore, an object of this invention is to provide apparatus for receiving and transferring articles of manufacture.

Particularly, an object of this invention is to provide apparatus for receiving and decelerating moving articles of manufacture without damaging them and transferring them in uniform orientation to a further work station.

One embodiment of this invention for achieving the above objects comprises apparatus which may be positioned adjacent the path of the moving article to be received and transferred. An article receiving and transferring mechanism is provided which may include a tubular shaft slidably and yieldingly mounted within a housing. The tubular shaft is positioned axially in the article path and means are provided for holding the article against the tubular shaft upon engagement of the article therewith. Upon impact of the article with the tubular shaft the tubular shaft recoils into the housing thereby preventing jarring and sudden stoppage of the moving article. Further means may be provided for cushioning the impact of the article with the tubular shaft and still further means may be provided for moving the housing including the shaft and article held thereby for transferring the article to a further work station.

A detailed description of a preferred embodiment of apparatus made according to this invention having utility for receiving and transferring electron tube mounts follows, reference being made to the attached drawing wherein:

FIG. 1 is a longitudinal section of a brazing jig containing a brazed mount which is received and transferred by the apparatus of this invention;

FIG. 2 is a side elevation of apparatus employing this invention and partially broken away to show details of construction; and, FIG. 3 is a partial view of the apparatus shown in FIG. 2 and showing the receiving and transferring mechanism at a later step than shown in FIG. 2.

In FIG. 1 is shown a brazing jig 10 containing a brazed mount 12 of a type which may be received and transferred by apparatus of this invention. The jig 10 comprises a cup-shaped shell 14 having an insert 15 therein providing a ledge 16 adjacent the upper end 17 of the jig, and two coaxial jigging cylinders 19 and 20. The tube mount 12 comprises tubular electrodes 22 and 23, and tubular electrode support 24 snugly received within or around the jigging cylinders 19 and 20, electrode support flanges 27, 28 and 29 mounted on the ends of the electrodes, flange support and conductive lead-ins 31 engaging the flanges, and a disk-like header wafer 33 resting on ledge 16. A heater 35 is positioned within electrode support 24 and mechanically secured to two of the leads 31. All of the parts referred to excepting the heater are brazed together where they engage each other, the leads 31 being brazed to the walls of bores 37 extending through wafer 33. Wafer 33 substantially closes the top open end 17 of jig 10. To allow entry of air to jig 10 to blow the mount therefrom, a number of slots 39 are provided through the wall of jig 10 and insert 15.

Apparatus for extracting a mount 12 from the jig 10 is shown in FIG. 2, and comprises a block 42 having a cavity 44 therein including (FIG. 3) upper and lower portions 50 and 52, respectively. The loaded jig may be inserted into cavity 44 (FIG. 2) through the lower end thereof by means of a plunger 46, the plunger sealing the lower end of cavity 44. The top end 17 of shell 14 of the jig abuts against an inverted ledge 48 provided by the lower end of the wall of the upper portion 50 of cavity 44. Ledge 48, the jig shell 14, and wafer 33 closing the top end of jig 10 cooperate to seal the upper cavity portion 50 from the lower cavity portion 52. Upper cavity portion 50 has a diameter less than that of the jig but greater than that of wafer 33.

Pressurized air may be admitted into lower cavity portion 50 through a duct 54 and may enter the jig through slots 39. When the pressure within the jig becomes high enough the mount is blown out of the jig into and through upper portion 50 of cavity 44.

Apparatus 60 for receiving and transferring the mount 12 is shown in FIG. 2 mounted on block 42 by means of a bracket 58. The receiving apparatus 60 comprises a housing 62 pivotally mounted on a pin 63 secured to bracket 58. A spring 64 is provided for urging housing 62 to pivot clockwise as viewed in FIG. 2 to the position shown in FIG. 3, and a latch arrangement 67 is provided for maintaining or latching housing 62 in the vertical orientation shown in FIG. 2. The latch arrangement 67 includes a latch arm 68 pivotally mounted on bracket 58 and a spring 69 secured within a block 70 for biasing the end 71 of arm 68 against stop 72. Latch arm 68 engages a rod 75 secured to housing 62. Arm 68 may be raised by means to be described hereinafter thereby unlatching rod 75 and permitting rotation of housing 62 to the position shown in FIG. 3.

Slidably mounted for movement within a chamber or bore 77 within housing 62 is a mount receiving mechanism 76 including a tubular shaft 78. The top end of shaft 78 is secured to a rod 80 extending outwardly of housing 62, apertures being provided through the top end of shaft 78 allowing communication between the inside of shaft 78 and bore 77. Bore 77, in turn, communicates with a continuously worked vacuum pump through flexible hose 82.

Rod 80 is provided with a pair of ring-like nuts 83 threaded thereon, nuts 83 resting against the top end of housing 62 for controlling the length of tubular shaft 78 extending downwardly from housing 62. A track 85 is also provided secured to bracket 58. Track 85 is engaged and followed by nuts 83 after transfer of the mount 12 for maintaining tubular shaft 78 inwardly of housing 62 for reasons to be described hereinafter.

Secured at the lower end of shaft 78 is a tubular port member 87 of soft yieldable material, preferably of rubber, the inner diameter of port member 87 being less than the diameter of the wafer 33 of mount 12. The mount receiving mechanism 76 plus rod 80 attached thereto is of relatively small mass for reasons to be described. For a mount weighing about 0.583 gram for example, the weight of the mount receiving mechanism 76 and rod 80 may be about 24.7 grams.

In the latched position shown in FIG. 2, tubular shaft 78 is positioned directly over, and with its axis aligned with the axis of, the cavity 44 of the mount extracting apparatus, hence directly in the path of the moving mount 12. Also, the lower end of port member 87 extends into upper cavity portion 50 so as to be positioned very close to the jig in order to reduce the length of free travel of the extracted mount. As shown in the unlatched position in FIG. 3, housing 62 is rotated by spring 64 so as to move the tubular port member 87 away from the mount extracting apparatus.

At the start of the mount removal operation, the receiving mechanism is held in the latched position shown in FIG. 2. After the mount 12 is blown from its jig 10 and out of cavity 44, the mount strikes the lower end of port member 87, peripheral portions of the mount wafer 33 engaging the wall of port member 87, and the extending leads 31 being inserted therewithin.

Port member 87 is made of soft, yieldable material, as mentioned, and most of the shock of impact of the mount against the receiving mechanism 76 is absorbed by the port member. Further, because of the small mass of the receiving mechanism 76 and rod 80, as mentioned, and the slidable mounting of shaft 78 within housing 62, the tubular shaft 78 recoils inwardly of housing 62 upon impact of mount 12 therewith. Recoil of tubular shaft 78, in combination with the yielding port member 87 avoids sudden stoppage and jarring of the mount. Further, because of the recoil of tubular shaft 78, the mount does not bounce away from port member 87 but remains in contact with it long enough to seal the end of port member 87 and permit at least partial evacuation of the air within bore 77 of housing 62 and tubular shaft 78 through the hose 82. Atmospheric pressure thereafter holds mount 12 against port member 87 and further impels the already recoiling tubular shaft 78 inwardly of housing 62. Tubular shaft 78 is thereafter held within housing 62 by atmospheric pressure, thereby maintaining the mount clear of block 42 of the mount extraction apparatus and allowing unobstructed movement and transfer of the mount.

Upon impact of the mount 12 with port member 87 and movement of tubular shaft 78 inwardly of housing 62, the top end of rod 80 secured to tubular shaft 78 strikes against and raises arm 68 of the latch arrangement 67. This unlatches the rod 75 secured to housing 62 whereby the housing 62 is rotated by spring 64. As shown in FIG. 3, the rotation of housing 62 conveys shaft 78 and the mount secured thereto away from block 42 of the mount extraction apparatus. Although not shown, the position to which the mount is conveyed may be the loading station of further automatic mechanisms for processing the electron tube mount or it may be a position where an operator may conveniently grasp the mount and remove it from tubular shaft 78.

As mentioned, tubular shaft 78 is maintained inwardly of housing 62 by atmospheric pressure, nuts 83 on rod 80 thereby being maintained above the housing 62. As shown in FIG. 3, nuts 83 are maintained at a height beyond track 85 while the mount 12 is held by port member 87, the mount sealing the port member. Upon removal of the mount, the vacuum seal of tubular shaft 78 is broken and gravity urges tubular shaft 78 downwardly and outwardly of housing 72. Nuts 83 engage track 85 however, and prevent full downward movement of the tubular shaft 78 until housing 62 is rotated to reposition tubular shaft 78 vertically over cavity 44 of the mount extracting apparatus. The reason for this is to maintain port member 87 removed from the block 42 of the mount removal apparatus in order to permit repositioning of tubular shaft 78 over cavity 44 without collision between the port member 87 and block 42. When tubular shaft 78 reaches its vertical position, nuts 83 disengage track 85 and port member 87 drops downwardly into cavity 44 as shown.

After the mount is removed from tubular shaft 78, housing 62 is rotated either manually or automatically by means not shown, and rod 75 is relatched to the latch arm 68.

What is claimed is:

1. Apparatus for receiving and transferring an electron tube mount blown from a brazing jig along a given path, said apparatus comprising a rotatably mounted housing having a chamber therein and a source of vacuum communicating with said chamber, an open-ended tubular shaft slidably mounted for movement longitudinally of said housing, one end of said shaft being received within said chamber and establishing communication between said chamber and the inside of said shaft, the other end of said shaft extending outwardly of said housing and having a tubular port of resilient material mounted on the end thereof, means latching said housing in an orientation to position said port member in the path of a tube mount, whereby said mount engages and closes the open end of said tubular port and moves said shaft inwardly of said housing, means for unlatching said housing upon inward movement of said shaft, and means for rotating said housing for positioning said port member remote from said path.

2. Apparatus for receiving and transferring an article of manufacture comprising:
   means for ejecting an article from a work position along a path,
   receiving means for intercepting and holding an ejected article,
   said receiving means being movable into the path of said article for intercepting said article, the resistance to acceleration of said receiving means in the direction of movement of said article when said receiving means is in position to intercept said article being small in comparison with the momentum of the ejected article, whereby as a result of impact of said article with said receiving means recoil of said receiving means occurs,
   means associated with said receiving means for cushioning the impact of said article with said receiving means, and
   means responsive to the recoil of said receiving means for moving said receiving means out of said path for transferring said article.

3. Apparatus for receiving and transferring an article of manufacture comprising:
   means for ejecting an article from a work position along a path,
   a housing,
   receiving means slidably mounted in said housing for intercepting and holding a moving article, said receiving means being movable into the path of said article for intercepting said article, said receiving means having a low resistance to acceleration in the direction of movement of said article in comparison with the momentum of said article when said receiving means is in position to intercept said article, whereby as a result of impact of said article with said receiving means recoil of said receiving means occurs, means for cushioning the impact of said article with said receiving means for preventing damage to said article, means for maintaining said article engaged with said receiving means and for maintaining said receiving means in its recoiled position within said housing while said article is engaged therewith, means for moving said article receiving means for transferring the article held thereby, and means for maintaining said receiving means in its recoiled position within said housing after disengagement of said article therefrom.

4. Apparatus for receiving and transferring an article of manufacture ejected from a work position along a path, said apparatus comprising:

a housing having a vacuum chamber therein and means for evacuating said chamber, a tubular article receiving member slidably mounted in said housing to move longitudinally thereof, said receiving member being movable along the path of said article, one end of said receiving member extending into said chamber and establishing communication between said chamber and the inside of said receiving member, and the other end of said receiving member being movable into the path of said article for intercepting said article and being closed thereby, said receiving member having a low inertia in comparison with the inertia of said moving article, and said chamber being evacuated by said evacuating means while said receiving member is in position for interception of said article, whereby the resistance to movement of said receiving member inwardly of said housing is low and recoil of said receiving member occurs as a result of said interception, and means responsive to the inward movement of said tubular member for rotating said housing and said tubular member therein for transferring said article.

References Cited by the Examiner
UNITED STATES PATENTS

| 1,222,535 | 4/17 | Crum. |
| 1,362,286 | 12/20 | Gerhardt. |
| 2,247,787 | 7/41 | Schmidt. |
| 2,427,712 | 9/47 | Casler. |
| 2,790,536 | 4/57 | Reed. |
| 2,928,519 | 3/60 | Finston. |

FOREIGN PATENTS

| 237,045 | 9/60 | Australia. |

HUGO O. SCHULZ, *Primary Examiner.*